US011635940B2

United States Patent
Mihara

(10) Patent No.: US 11,635,940 B2
(45) Date of Patent: Apr. 25, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Makoto Mihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 114 days.

(21) Appl. No.: 17/015,152

(22) Filed: Sep. 9, 2020

(65) Prior Publication Data
US 2021/0208845 A1 Jul. 8, 2021

(30) Foreign Application Priority Data
Jan. 8, 2020 (JP) .............................. JP2020-001697

(51) Int. Cl.
*G06F 16/23* (2019.01)
*G06F 7/08* (2006.01)

(52) U.S. Cl.
CPC ............ *G06F 7/08* (2013.01); *G06F 16/2365* (2019.01)

(58) Field of Classification Search
CPC ............................... G06F 16/2365; G06F 7/08
USPC ....................................................... 707/691
See application file for complete search history.

(56) References Cited

U.S. PATENT DOCUMENTS

| 7,461,077 B1* | 12/2008 | Greenwood | G06F 16/2428 707/999.102 |
| 9,183,203 B1* | 11/2015 | Tuchman | G06F 16/3325 |
| 2006/0080293 A1* | 4/2006 | Nahum | G06F 16/3347 |
| 2008/0101765 A1* | 5/2008 | Lee | H04N 21/4263 386/218 |
| 2008/0172389 A1* | 7/2008 | Cho | G06F 16/168 |
| 2010/0083029 A1* | 4/2010 | Erickson | G06F 11/079 714/2 |
| 2011/0141127 A1* | 6/2011 | Chang | G02F 1/13306 345/581 |
| 2011/0285817 A1* | 11/2011 | Tsukagoshi | H04N 13/172 348/E13.001 |
| 2012/0173925 A1* | 7/2012 | Lahdensivu | G06F 11/1453 714/15 |
| 2013/0104105 A1* | 4/2013 | Brown | G06F 11/3684 717/124 |
| 2014/0181089 A1* | 6/2014 | Desmond | G06F 16/901 707/722 |
| 2014/0188907 A1* | 7/2014 | Benchenaa | G06F 16/904 707/752 |
| 2015/0066213 A1* | 3/2015 | Morita | F16H 61/0204 700/275 |

(Continued)

FOREIGN PATENT DOCUMENTS

JP 2009-169675 A 7/2009

*Primary Examiner* — James Trujillo
*Assistant Examiner* — Fariborz Khoshnoodi
(74) *Attorney, Agent, or Firm* — Oliff PLC

(57) ABSTRACT

An information processing apparatus includes a processor configured to accept designation of a set as a first set that needs a correction to a sorting result, the set being one of sets into which multiple types of data are sorted by type, and cause data included in the first set and data not included in the first set to be presented in response to acceptance of the designation, the data not included in the first set being included in the multiple types of data including the first set.

10 Claims, 15 Drawing Sheets

(56) References Cited

U.S. PATENT DOCUMENTS

| | | | | |
|---|---|---|---|---|
| 2017/0308906 | A1* | 10/2017 | McCauley | G06Q 20/407 |
| 2018/0076931 | A1* | 3/2018 | Gladwin | G06F 11/1076 |
| 2018/0232145 | A1* | 8/2018 | Goto | G06F 3/0683 |
| 2020/0007483 | A1* | 1/2020 | Mou | H04L 51/04 |
| 2020/0379609 | A1* | 12/2020 | Jacob | G06F 3/0482 |

* cited by examiner

FIG. 3

| DATA ID | DOCUMENT ID | NUMBER OF PAGES | POST-PROCESSING | USERNAME | USER EMAIL ADDRESS |
|---|---|---|---|---|---|
| 0001 | S1 | 3 | APPROVAL | U1 | u1@fujixerox.co.jp |
| 0001 | S2 | 2 | ATTRIBUTE SETTING | U2 | u2@fujixerox.co.jp |
| 0001 | S3 | 1 | APPROVAL | U3 | u3@fujixerox.co.jp |
| 0001 | S4 | 4 | ATTRIBUTE SETTING | U4 | u4@fujixerox.co.jp |
| 0002 | S5 | 5 | STAMP | U5 | u5@fujixerox.co.jp |
| 0003 | S6 | 3 | APPROVAL | U6 | u6@fujixerox.co.jp |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-001697 filed Jan. 8, 2020.

BACKGROUND

(i) Technical Field

The present disclosure relates to an information processing apparatus and a non-transitory computer readable medium.

(ii) Related Art

A known document processing apparatus extracts row regions from a document image, detects for each row region a plurality of row attributes each of which is based on one of a plurality of predetermined attribute types, detects style properties each of which represents a pattern of combination of row attributes, identifies major style properties of a plurality of detected style properties for the document image, and determines separating positions in the document image in accordance with the degree of change from a page to the next page in the major style properties (for example, refer to Japanese Unexamined Patent Application Publication No. 2009-169675)

SUMMARY

For managing a plurality of types of data, the plurality of types of data are sometimes sorted into sets by type. In such a case, if the grouping obtained as a sorting result is inappropriate and a correction to the sorting result is needed, a user needs to re-sort all the unsorted data, and a re-sorting operation is cumbersome for the user.

Aspects of non-limiting embodiments of the present disclosure relate to reducing an operation load needed to re-sort sorted sets compared with a case where a plurality of types of data that include the sorted sets are not acquired when the sorted sets are re-sorted.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to accept designation of a set as a first set that needs a correction to a sorting result, the set being one of sets into which a plurality of types of data are sorted by type, and cause data included in the first set and data not included in the first set to be presented in response to acceptance of the designation, the data not included in the first set being included in the plurality of types of data including the first set.

BRIEF DESCRIPTION OF THE DRAWINGS

An exemplary embodiment of the present disclosure will be described in detail based on the following figures, wherein:

FIG. 3 is an illustration depicting an example of sorting result information stored in a sorting result information repository of the document processing apparatus according to the exemplary embodiment of the present disclosure;

DETAILED DESCRIPTION

Hereinafter, an exemplary embodiment of the present disclosure will be described in detail with reference to the attached drawings.

Hardware Configuration of Document Processing Apparatus

Figure 1:
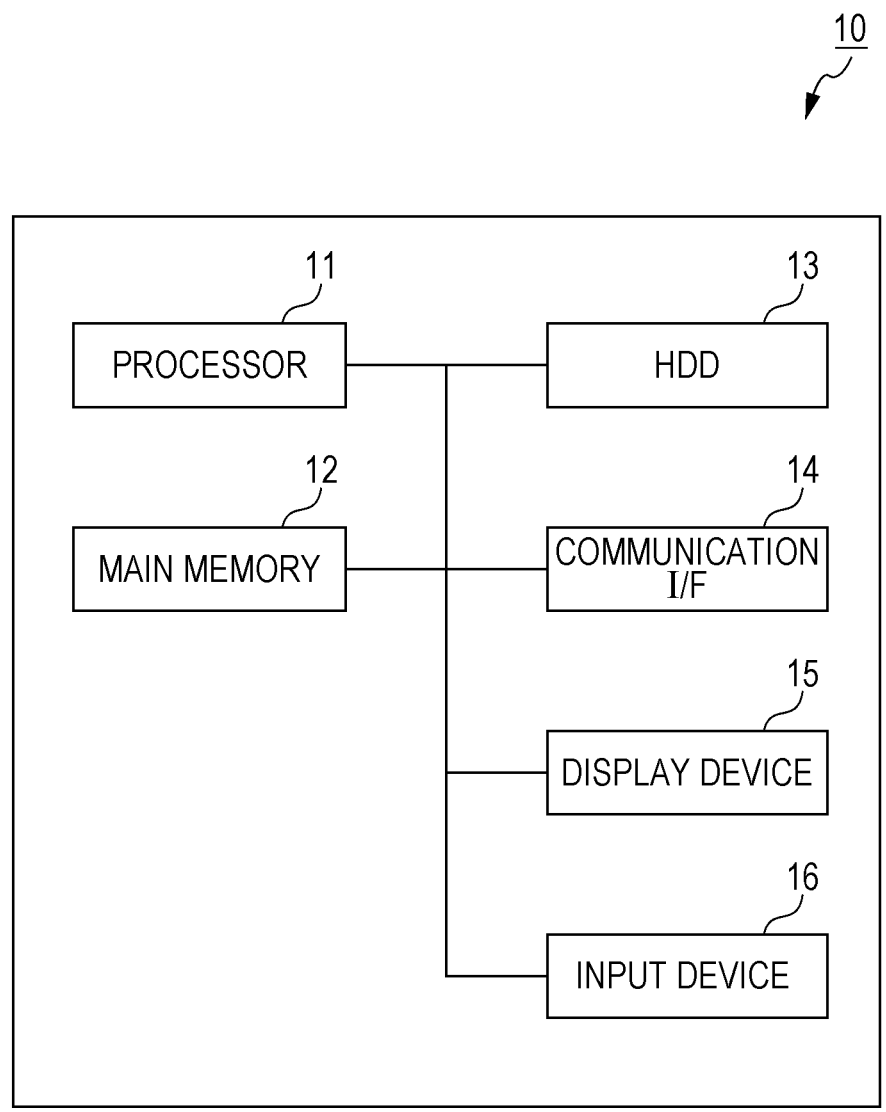
FIG. 1 is a diagram depicting an example of a hardware configuration of a document processing apparatus according to the exemplary embodiment of the present disclosure.

FIG. 1 is a diagram depicting an example of a hardware configuration of a document processing apparatus 10 according to the present exemplary embodiment. As depicted in FIG. 1, the document processing apparatus 10 includes a processor 11, which is a calculating unit, and a main memory 12 and a hard disk drive (HDD) 13, which are storage units. The processor 11 executes various kinds of software such as the operating system (OS) and applications and realizes various functions described below. The main memory 12 is a storage region to store various kinds of software, data to be used for execution of the various kinds of software, and the like. The HDD 13 is a storage region to store data that is input to the various kinds of software, data that is output from the various kinds of software, and the like. Further, the document processing apparatus 10 includes a communication interface (I/F) 14 for communicating with external apparatuses, a display device 15 such as a display, and an input device 16 including a keyboard and a mouse.

Outline of Present Exemplary Embodiment

In the present exemplary embodiment, the document processing apparatus 10 accepts designation of a set as a first set that needs a correction to a sorting result. The set is one of sets into which a plurality of types of data are sorted by type. In response to an acceptance of the designation, the document processing apparatus 10 presents data included in the first set and data not included in the first set. The data not included in the first set is included in the plurality of types of data including the first set. Then, the document processing apparatus 10 accepts instructions to re-sort the plurality of types of data.

The plurality of types of data may be general electronic documents, but in an example described below, the plurality of types of data are assumed to be read data obtained by scanning a manuscript by using an image reading apparatus. The plurality of types of data are not limited to electronic documents and may be data such as image data or moving image data. Further, a type described here indicates one of groups each having common characteristics, and data is sorted into the groups in accordance with some viewpoint. For example, pieces of data having a common data identification (ID), pieces of data to be subjected to common post-processing, pieces of data created by a common user, and the like are each regarded as a single type of data and distinguished from other types of data. A set may be a document obtained by dividing an assembled electronic document. In the following description, for example, a set is assumed to be one of the documents into which read data is sorted (hereinafter, one of the documents is referred to as a "sorted document"). Further, data included in the first set and data not included in the first set may be composed of any data unit that forms a sorted document. In the following description, a page of a sorted document is assumed to be a data unit.

Functional Configuration of Document Processing Apparatus

Figure 2:
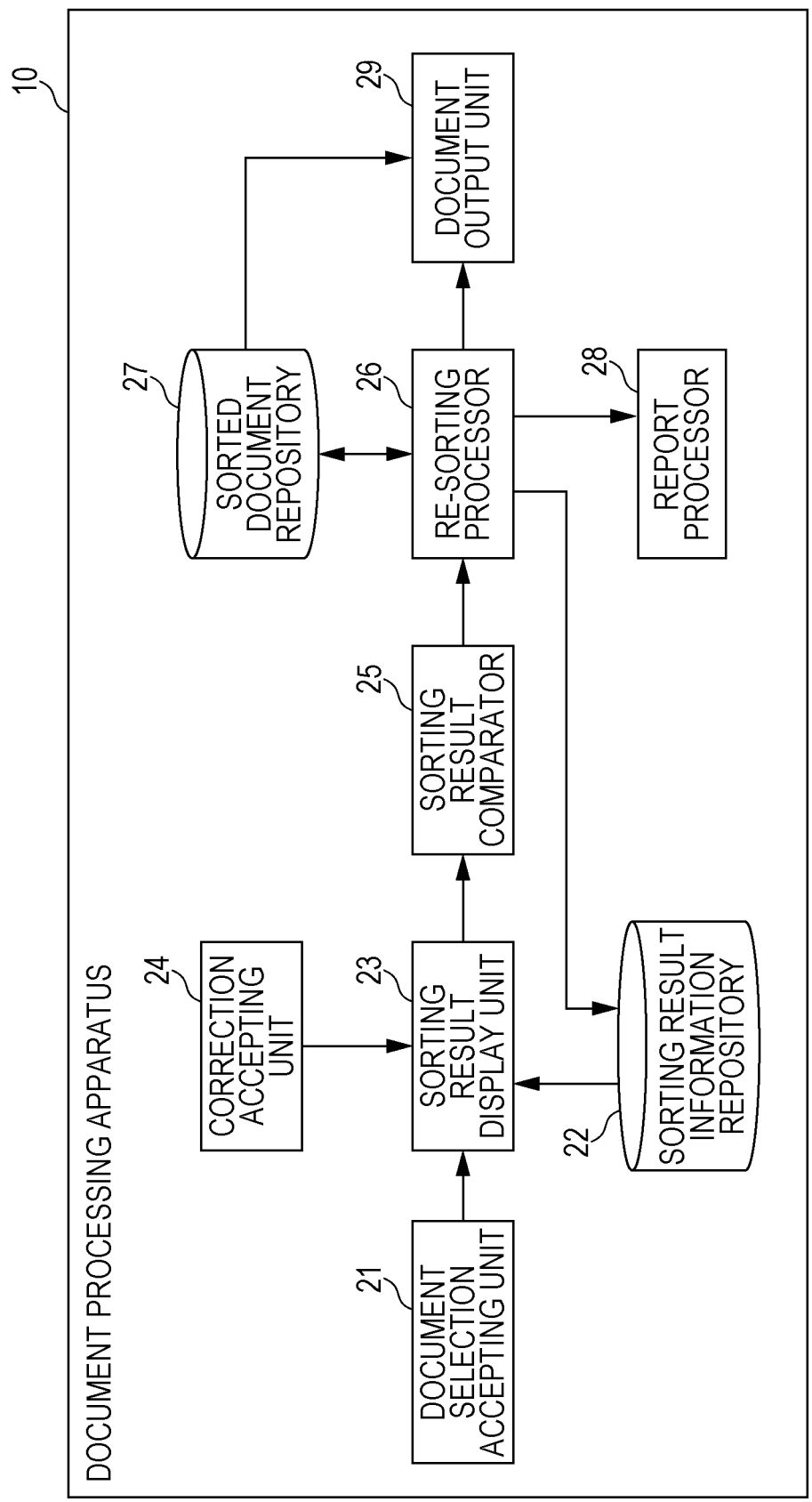
FIG. 2 is a block diagram depicting an example of a functional configuration of the document processing apparatus according to the exemplary embodiment of the present disclosure.

FIG. 2 is a block diagram depicting an example of a functional configuration of the document processing apparatus 10 according to the present exemplary embodiment. The document processing apparatus 10 according to the present exemplary embodiment is an example of an information processing apparatus, and includes, as depicted in FIG. 2, a document selection accepting unit 21, a sorting result information repository 22, a sorting result display unit 23, a correction accepting unit 24, a sorting result comparator 25, a re-sorting processor 26, a sorted document repository 27, a report processor 28, and a document output unit 29.

The document selection accepting unit 21 accepts a selection of a sorted document that is judged by a user to be incorrectly sorted among a plurality of sorted documents obtained by sorting read data. In other words, a selection of a sorted document judged by the user to need a correction to the sorting result is accepted. Examples of the correction to the sorting result include moving from a sorted document a piece of data that is included in the sorted document and that is unsuitable for the sorted document. In the present exemplary embodiment, a sorted document judged by the user to need a correction to the sorting result is used as an example of a first set, and the document selection accepting unit 21 is installed as an example of a unit that accepts designation as a first set. In the following description, a user is assumed to judge whether a correction to a sorting result is needed, but a computer may make such a judgment.

The sorting result information repository 22 stores information regarding a preceding sorting result and the like (referred to as "sorting result information" below). Sorting result information provides information such as the way in which read data is sorted into sorted documents, the number of pages of each sorted document, and the user who processes each sorted document. A specific example of the sorting result information will be described below.

In response to an acceptance by the document selection accepting unit 21 of a selection of a sorted document judged by the user to be incorrectly sorted, the sorting result display unit 23 acquires the preceding sorting result of read data containing the sorted document, the preceding sorting result being acquired from the sorting result information stored in the sorting result information repository 22. Then, the sorting result display unit 23 causes the display device 15 to present the preceding sorting result. In other words, the sorting result display unit 23 causes the display device 15 to present pages of the sorted document judged by the user to need a correction to the sorting result and pages of other sorted documents sorted together with the sorted document. In the present exemplary embodiment, the pages of the sorted document judged by the user to need a correction to the sorting result are used as an example of data included in the first set, and the pages of other sorted documents sorted together with the sorted document are used as an example of data not included in the first set. The sorting result display unit 23 is installed as an example of a unit that causes the data included in the first set and the data not included in the first set to be presented.

At that time, the sorting result display unit 23 may cause the display device 15 to present in a distinguishable manner the pages of the sorted document judged by the user to need a correction to the sorting result and the pages of other sorted documents sorted together with the sorted document. In this case, the sorting result display unit 23 is an example of a unit that causes the data included in the first set and the data not included in the first set to be presented in a distinguishable manner.

In addition, as described below, in response to an acceptance by the correction accepting unit 24 of a correction to the sorting result, the sorting result display unit 23 causes the display device 15 to present the current sorting result, which is obtained by making this correction to the preceding sorting result.

At that time, the sorting result display unit 23 may cause the preceding sorting result to remain presented. In this case, the preceding sorting result is an example of a state before a re-sorting operation, and the sorting result display unit 23 is an example of a unit that causes the state before the re-sorting operation to be presented. The sorting result display unit 23 may control switching from presenting to hiding the preceding sorting result and from hiding to presenting the preceding sorting result. In this case, the sorting result display unit 23 is an example of a unit that controls switching between presenting and hiding the state before the re-sorting operation.

The sorting result display unit 23 may also cause the final state of a sorted document to be presented. The final state of the sorted document is a state in which the correction accepted by the correction accepting unit 24 has actually been made. The final state of the sorted document is desirably presented, for example, by using an icon imitating a document having bound sheets of paper. In this case, the final state of the sorted document is an example of a state after a re-sorting operation, and the sorting result display unit 23 is an example of a unit that causes the state after the re-sorting operation to be presented.

Further, the sorting result display unit 23 outputs the preceding sorting result and the current sorting result to the sorting result comparator 25.

The correction accepting unit 24 accepts a correction to a sorting result by using a sorting result presented by the display device 15 under the control of the sorting result display unit 23. Examples of a correction to a sorting result include a correction in which a single sorted document is divided into a plurality of sorted documents, a correction in which a plurality of sorted documents are combined into a single sorted document, and a correction in which a page of a sorted document is moved to another sorted document. In the present exemplary embodiment, a correction to a sorting result is used as an example of instructions to re-sort a plurality of types of data, and the correction accepting unit 24 is installed as an example of a unit that accepts instructions to perform a re-sorting operation.

The sorting result comparator 25 receives the preceding sorting result and the current sorting result from the sorting result display unit 23, compares these sorting results, and judges one or more sorted documents to need a re-sorting operation. Then, the sorting result comparator 25 outputs to the re-sorting processor 26 information for identifying the one or more sorted documents judged to need a re-sorting operation.

The re-sorting processor 26 re-sorts the one or more sorted documents in accordance with the information for identifying the one or more sorted documents. The information is received from the sorting result comparator 25. In other words, the re-sorting processor 26 acquires the one or more sorted documents from the sorted documents obtained by sorting the read data in the preceding sorting operation and stores the one or more sorted documents in the sorted document repository 27. The one or more sorted documents are identified by using the information received from the sorting result comparator 25. Then, the re-sorting processor 26 re-sorts the one or more sorted documents stored in the sorted document repository 27.

Further, as described below, in response to a report from the report processor 28 on presence of one or more unsuitable pages, the re-sorting processor 26 removes the one or more unsuitable pages if no sorted document to which the one or more unsuitable pages are to be moved is found. In this case, the re-sorting processor 26 is an example of a unit that removes data unsuitable for the first set from the plurality of types of data if the data unsuitable for the first set is not to be included in the data not included in the first set either.

Further, the re-sorting processor 26 updates the sorting result information stored in the sorting result information repository 22 in accordance with information concerning a re-sorting operation and page removal.

Once the re-sorting processor 26 receives the information for identifying the one or more sorted documents from the sorting result comparator 25, the sorted document repository 27 temporarily stores the one or more sorted documents identified by this information. The one or more sorted documents to be temporarily stored are acquired from a document management system 30 if the one or more sorted documents are output to the document management system 30 as described below. If the re-sorting processor 26 re-sorts the temporarily stored one or more sorted documents, one or more sorted documents obtained by the re-sorting operation are stored instead of the temporarily stored one or more sorted documents.

The report processor 28 identifies one or more users who need to perform post-processing on the one or more sorted documents obtained by the re-sorting operation and reports to the one or more users that the re-sorting operation has been performed. In the present exemplary embodiment, the report processor 28 is installed as an example of a unit that reports to an operator who manipulates data modified by the re-sorting operation that the data has been modified.

Further, once the document selection accepting unit 21 accepts a selection of a sorted document judged by the user to need a correction in which a page unsuitable for the sorted document is moved from the sorted document, the report processor 28 may report on the presence of the unsuitable page to all the users who process sorted documents other than this sorted document. Alternatively, the presence of the unsuitable page may be reported to at least one user who processes sorted documents other than this sorted document. In this case, the report processor 28 is an example of a unit that reports to at least one operator who manipulates the data not included in the first set that the data unsuitable for the first set is present.

The document output unit 29 outputs the one or more sorted documents re-sorted by the re-sorting processor 26 to an external apparatus. In other words, the document output unit 29 outputs to the external apparatus the one or more sorted documents that are stored in the sorted document repository 27 after the one or more sorted documents are re-sorted by the re-sorting processor 26. At that time, the one or more sorted documents that have been output to the external apparatus may be removed from the sorted document repository 27. The external apparatus mentioned here may be any system or apparatus, and, in the following description, it is assumed that the one or more sorted documents are output to the document management system 30, which provides a document management service that manages documents.

A specific example of the sorting result information stored in the sorting result information repository 22 depicted in FIG. 2 will be described herein.

FIG. 3 is an illustration depicting an example of the sorting result information.

As depicted in FIG. 3, the sorting result information contains a data ID, a document ID, the number of pages, post-processing, a username, and a user email address, which are associated with each other.

The data ID is identification information for identifying read data to be sorted. In the following description, a piece of read data whose data ID is "X" is denoted by "read data X".

The document ID is identification information for identifying each sorted document obtained by sorting the corresponding read data. In the following description, a sorted document whose document ID is "Sn" is denoted by a "sorted document Sn".

The number of pages is the number of pages constituting the corresponding sorted document.

The post-processing is information indicating content of a process to be performed on the corresponding sorted document after a sorting operation is performed. Examples of the post-processing include an approval, a stamp, and an attribute setting. The attribute setting is a process in which attributes, such as the date and time of creation and the title, are extracted from a sorted document, and the attributes are assigned to the sorted document for an attribute search in the document management service.

The username is the name of a user who performs post-processing on the corresponding sorted document. In the following description, a user whose username is "Un" is denoted by a "user Un". For convenience, it is assumed in this example that a different username is registered for a different document ID, but the same username may be registered for different document IDs.

The user email address is an email address of a user who performs post-processing on the corresponding sorted document.

FIG. 3 indicates that, for example, read data 0001 is sorted into sorted documents S1 to S4. The sorted document S1 contains 3 pages and is subjected to post-processing "approval" to be performed by a user U1 whose email address is "u1@fujixerox.co.jp". The sorted document S2 contains 2 pages and is subjected to post-processing "attribute setting" to be performed by a user U2 whose email address is "u2@fujixerox.co.jp". The sorted document S3 contains 1 page and is subjected to post-processing "approval" to be performed by a user U3 whose email address is "u3@fujixerox.co.jp". Further, the sorted document S4 contains 4 pages and is subjected to post-processing "attribute setting" to be performed by a user U4 whose email address is "u4@fujixerox.co.jp".

The sorting result information depicted in FIG. 3 is just an example and may contain information other than the information illustrated here. For example, in the following description, a document ID is sometimes used as a document title for convenience of description, but the sorting result information may contain a document title separately from the document ID. In addition, an object ID, which is attached by the document management service, may be included separately from the document ID, which is attached by the document processing apparatus 10.

Next, a brief outline will be described regarding a general operation in which sorted documents are subjected to post-processing and the document output unit 29 outputs the sorted documents to the document management system 30. In this example, it is assumed that the sorted documents are not re-sorted by the re-sorting processor 26.

Figure 4:
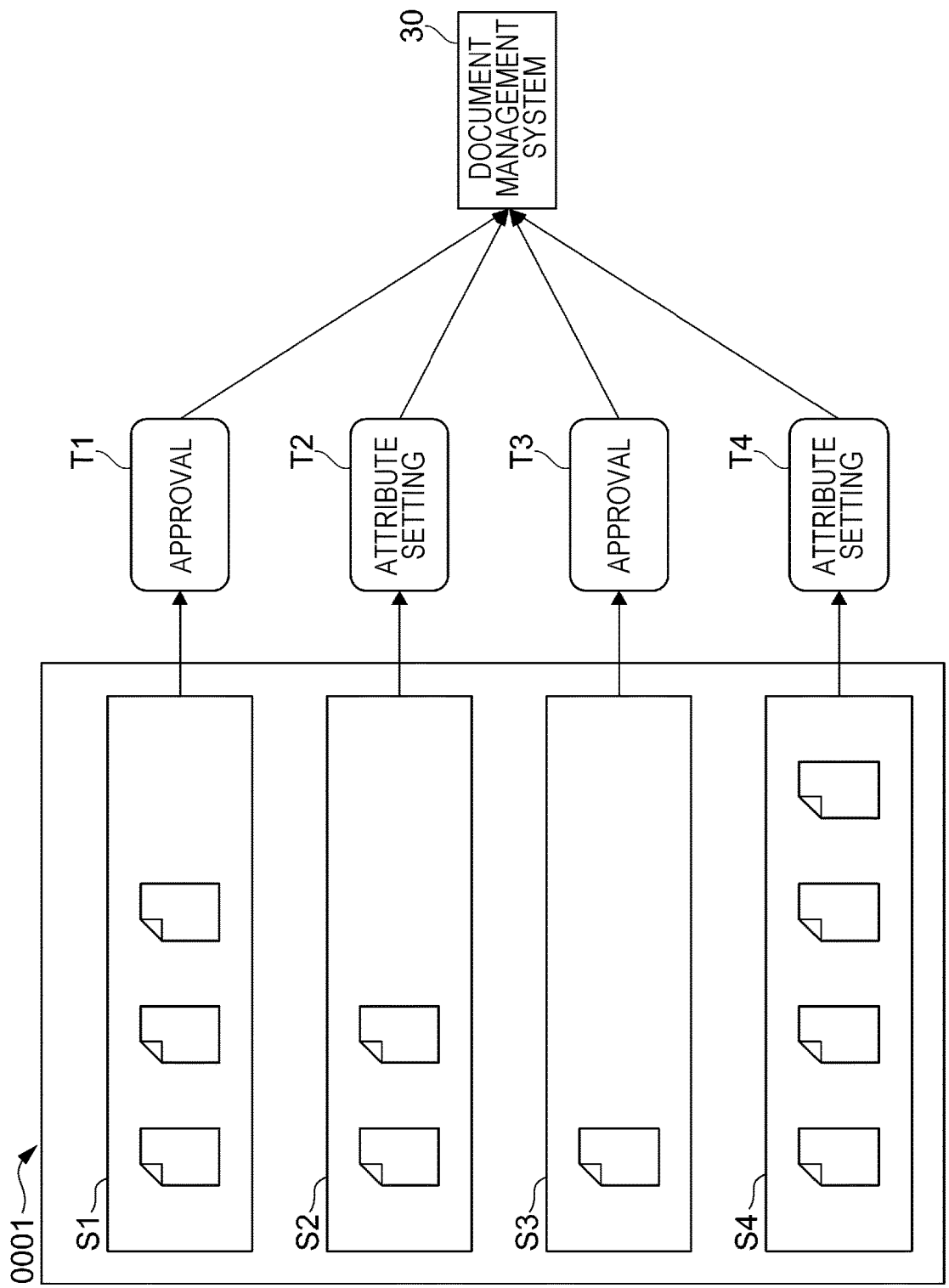
FIG. 4 is an illustration depicting a brief outline regarding an operation of a document output unit of the document processing apparatus according to the exemplary embodiment of the present disclosure when the document output unit outputs sorted documents that are not re-sorted to a document management system.

FIG. 4 is an illustration depicting a brief outline regarding an operation on sorted documents that are obtained by sorting the read data 0001 and that are not re-sorted. FIG. 4 illustrates that the sorted document S1 is subjected to an approval T1, the sorted document S2 is subjected to an attribute setting T2, the sorted document S3 is subjected to an approval T3, and the sorted document S4 is subjected to an attribute setting T4. FIG. 4 also illustrates that these sorted documents S1 to S4 are output to the document management system 30.

It is assumed that, for example, the user U3, who processes the sorted document S3, recognizes in this circumstance that the sorted document S3 needs another page and inputs the selection of the sorted document S3 into the document processing apparatus 10. Then, in the document processing apparatus 10, the document selection accepting unit 21 accepts the selection of the sorted document S3.

In response to the acceptance of the selection, the sorting result display unit 23 references the sorting result information stored in the sorting result information repository 22 to examine sorted documents that have been sorted at the same time as the sorted document S3. The sorted documents are included in the preceding sorting result of the read data 0001, which contains the sorted document S3. Then, the sorting result display unit 23 causes the display device 15 to present the preceding sorting result of the read data 0001 in accordance with the sorting result information. Specifically, the sorting result display unit 23 identifies the sorted documents S1 to S4, which are obtained by sorting the read data 0001, by using the sorting result information depicted in FIG. 3 and causes the display device 15 to present the sorted documents S1 to S4.

It is assumed that since the preceding sorting result is presented by the display device 15 in this way, for example, a user in charge of sorting operations recognizes that the second page of the sorted document S2 is to be placed at the second page of the sorted document S3. It is also assumed that by using the display device 15, the user performs a correction in which the second page of the sorted document S2 is moved to the second page of the sorted document S3. Then, the correction accepting unit 24 accepts the correction, which is used to modify the preceding sorting result, and replaces the preceding sorting result with the modified sorting result, which is the current sorting result.

A specific example of a user interface to be used for presenting and correcting such a sorting result will be described below.

After the correction is performed in this way, the sorting result comparator 25 compares the preceding sorting result and the current sorting result and identifies the sorted documents S2 and S3 each as a sorted document that needs to be re-sorted.

Thus, the re-sorting processor 26 re-sorts only the sorted documents S2 and S3 of the sorted documents obtained by sorting the read data 0001.

Figure 5:
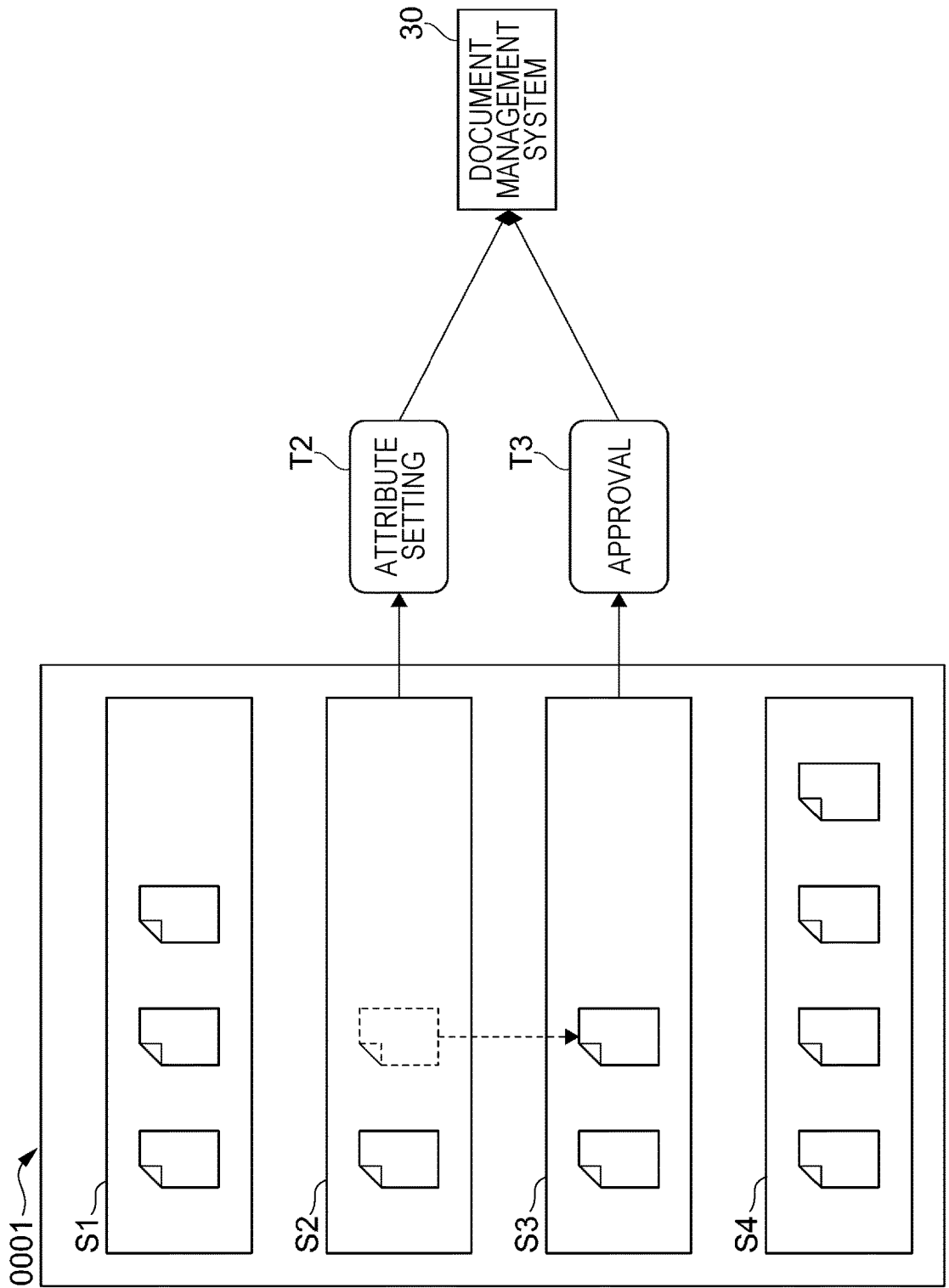
FIG. 5 is an illustration depicting a brief outline regarding an operation of the document output unit of the document processing apparatus according to the exemplary embodiment of the present disclosure when the document output unit outputs sorted documents that are re-sorted to the document management system.

FIG. 5 is an illustration depicting a brief outline regarding an operation on sorted documents that are obtained by re-sorting the read data 0001.

First, for performing post-processing on the sorted documents S2 and S3, which have been re-sorted, the report processor 28 reports to the users U2 and U3 that the sorted documents S2 and S3 have been re-sorted. Then, the users U2 and U3 perform the post-processing on the sorted documents S2 and S3, respectively, which have been re-sorted. FIG. 5 illustrates that the sorted document S2 is subjected to the attribute setting T2 and the sorted document S3 is subjected to the approval T3.

In contrast, the sorted documents S1 and S4 do not need to be re-sorted, and the preceding sorting result is adopted. Thus, the post-processing need not be repeated.

Consequently, the document processing apparatus 10 need not acquire the sorted documents S1 and S4 as sorted documents to be re-sorted from the document management system 30, either. However, FIG. 5 also illustrates the sorted documents S1 and S4 to indicate that these documents are present in the first sorting operation on the read data 0001.

Once the sorted documents have been subjected to the post-processing in this way, the document output unit 29 registers the sorted documents as proper sorted documents in the document management system 30. At that time, the sorted documents S2 and S3 registered before the re-sorting operation are removed from the document management system 30 because the sorted documents S2 and S3 have needed to be re-sorted.

In the above example, it is assumed that the user U3, who processes the sorted document S3, recognizes that the sorted document S3 needs another page and inputs the selection of the sorted document S3 into the document processing apparatus 10 and thus the process is started. But this is not meant to be limiting. The user U2, who processes the sorted document S2, may recognize that the sorted document S2 incorrectly includes an irrelevant page and input the selection of the sorted document S2 into the document processing apparatus 10, and thus the process may be started.

In either case, if one of the users recognizes on a screen presenting the sorted documents S1 to S4 that a page incorrectly included in the sorted document S2 is to be included in the sorted document S3, it is possible to move the page incorrectly included in the sorted document S2 to the sorted document S3.

In contrast, if none of the users recognizes that the page incorrectly included in the sorted document S2 is to be included in the sorted document S3, it is not possible to move the page incorrectly included in the sorted document S2 to the sorted document S3. Further, if the page incorrectly included in the sorted document S2 is related to none of the sorted document S1 to S4 in the first place, it is not possible to move the page incorrectly included in the sorted document S2 to another document.

In such a case, in the present exemplary embodiment, the report processor 28 reports to at least one of the users U1, U3, and U4, who process the sorted documents S1, S3, and S4, respectively, that the sorted document S2 incorrectly includes an irrelevant page. Then, if any of the users U1, U3, and U4 responds that the incorrectly included page is a page to be included in one of the sorted documents S1, S3, and S4 in the first place, the re-sorting processor 26 moves the incorrectly included page to a sorted document that is to include the incorrectly included page. Further, if none of the users U1, U3, and U4 responds that the incorrectly included page is a page to be included in one of the sorted documents S1, S3, and S4 in the first place, the re-sorting processor 26 removes the incorrectly included page.

Operation of Document Processing Apparatus

Figure 6:
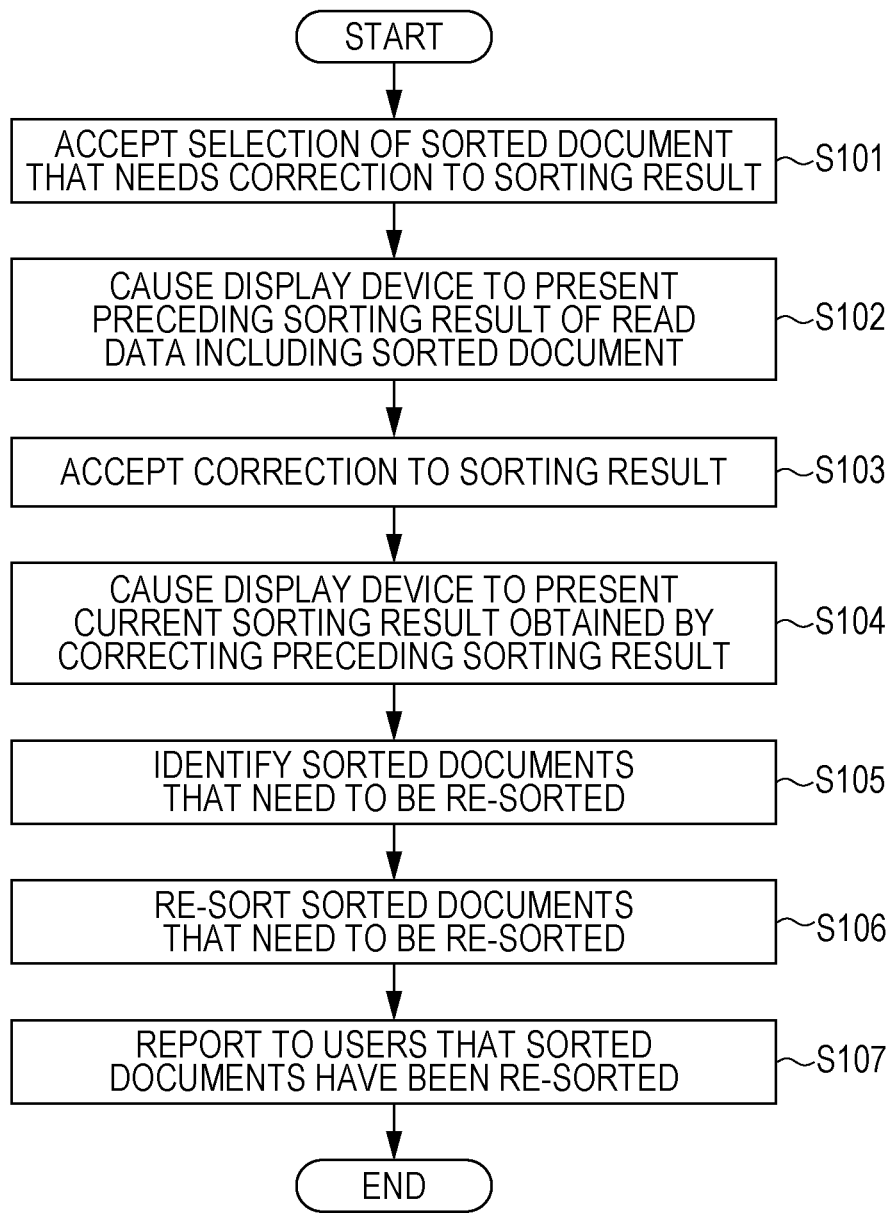
FIG. 6 is a flowchart depicting an example operation of the document processing apparatus according to the exemplary embodiment of the present disclosure.

FIG. 6 is a flowchart depicting an example operation of the document processing apparatus 10 according to the present exemplary embodiment.

As depicted in FIG. 6, in the document processing apparatus 10, the document selection accepting unit 21 first accepts a selection of at least one sorted document that needs a correction to a sorting result (step S101).

Then, the sorting result display unit 23 causes the display device 15 to present the preceding sorting result of read data that includes the at least one sorted document accepted in step S101 (step S102).

Next, the correction accepting unit 24 accepts a correction to the sorting result by using the preceding sorting result caused to be presented by the display device 15 in step S102 (step S103).

Subsequently, the sorting result display unit 23 causes the display device 15 to present the current sorting result (step S104). The current sorting result is obtained by correcting the preceding sorting result, which is caused to be presented by the display device 15 in step S102, and the correcting operation is based on the correction accepted in step S103.

Next, the sorting result comparator 25 compares the preceding sorting result and the current sorting result and thus identifies one or more sorted documents that need to be re-sorted (step S105).

Then, the re-sorting processor 26 re-sorts the one or more sorted documents that need to be re-sorted (step S106). The one or more sorted documents are identified in step S105.

The report processor 28 thereafter reports that the one or more sorted documents have been re-sorted in step S106 to one or more users who process the one or more sorted documents (step S107).

Presentation by Using Document Processing Apparatus

Figure 7:
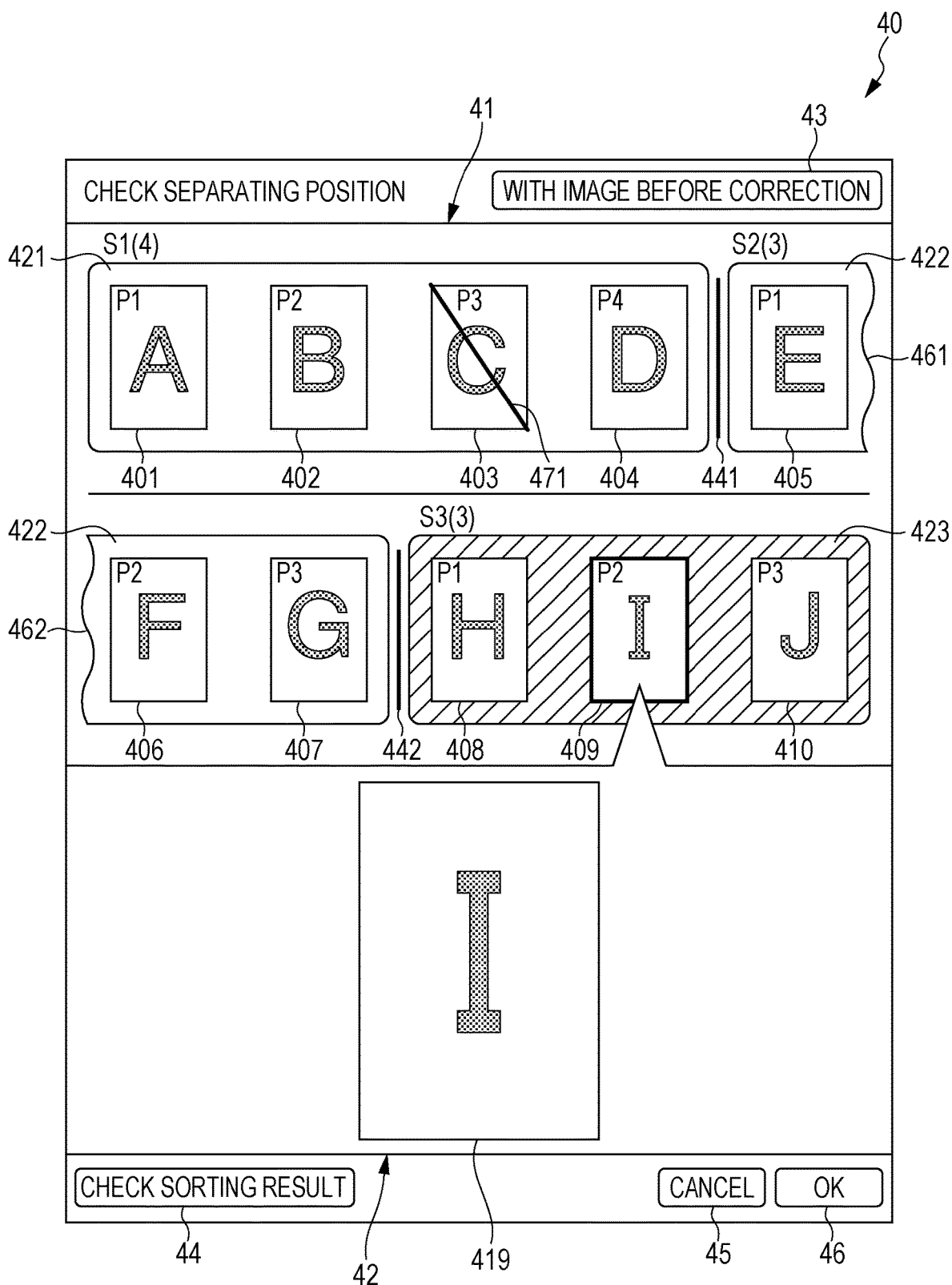
FIG. 7 is an illustration depicting an example of the initial state of a sorting screen presented by a sorting result display unit of the document processing apparatus according to the exemplary embodiment of the present disclosure.

FIG. 7 is an illustration depicting an example of the initial state of a sorting screen 40 presented by the sorting result display unit 23 depicted in FIG. 2.

As depicted in FIG. 7, the sorting screen 40 includes a thumbnail image area 41, a document image area 42, a display switch button 43, a sorting result check button 44, a cancel button 45, and an OK button 46.

The thumbnail image area 41 is an area where a thumbnail image of each page of sorted documents is arranged.

In FIG. 7, thumbnail images 401 to 404 of pages P1 to P4 of the sorted document S1, thumbnail images 405 to 407 of pages P1 to P3 of the sorted document S2, and thumbnail images 408 to 410 of pages P1 to P3 of the sorted document S3 are arranged in the thumbnail image area 41.

In the thumbnail image area 41, a region 421 indicating the range of the sorted document S1, a region 422 indicating the range of the sorted document S2, and a region 423 indicating the range of the sorted document S3 are also disposed. Thus, the thumbnail images 401 to 404 are arranged in the region 421, the thumbnail images 405 to 407 are arranged in the region 422, and the thumbnail images 408 to 410 are arranged in the region 423. Since the thumbnail images 401 to 410 spread over two rows, the right end of the region 422 in the first row is delineated by using a wavy line 461 indicating that the region continues in the row below, and the left end of the region 422 in the second row is delineated by using a wavy line 462 indicating that the region continues from the row above. Further, the region 423 is presented in a manner distinguishable from the regions 421 and 422, indicating that the sorted document S3 needs a correction to the sorting result. In FIG. 7, only the region 423 is hatched so as to be distinguishable from the regions 421 and 422, but, for example, the region 423 may be colored differently from the regions 421 and 422. The number of pages is indicated by a number in parentheses that follows a document title placed above the top left corner of each region.

In the thumbnail image area 41, a separating line 441 that separates the range of the sorted document S1 and the range of the sorted document S2 and a separating line 442 that separates the range of the sorted document S2 and the range of the sorted document S3 are also disposed. Thus, the separating line 441 is disposed between the region 421 and the region 422, and the separating line 442 is disposed between the region 422 and the region 423.

A removal mark 471 is also disposed in the thumbnail image area 41. The removal mark 471 indicates that page P3 of the sorted document S1 is to be removed.

The document image area 42 is an area where a document image of a selected page of a sorted document is disposed. In FIG. 7, as depicted by using a thick enclosing rectangle, page P2 of the sorted document S3 is selected, and thus a document image 419 of the selected page is disposed.

The display switch button 43 is used to switch between presenting and hiding the state of the sorting result before a correction. In FIG. 7, the message "with image before correction" indicates that presenting the state of the sorting result before the correction is selected.

The sorting result check button 44 is used to check the state of sorted documents to be obtained by actually performing a sorting operation in accordance with a sorting result at the moment.

The cancel button 45 is used to cancel the sorting operation of the moment, and the OK button 46 is used to finalize the sorting operation of the moment.

Figure 8:
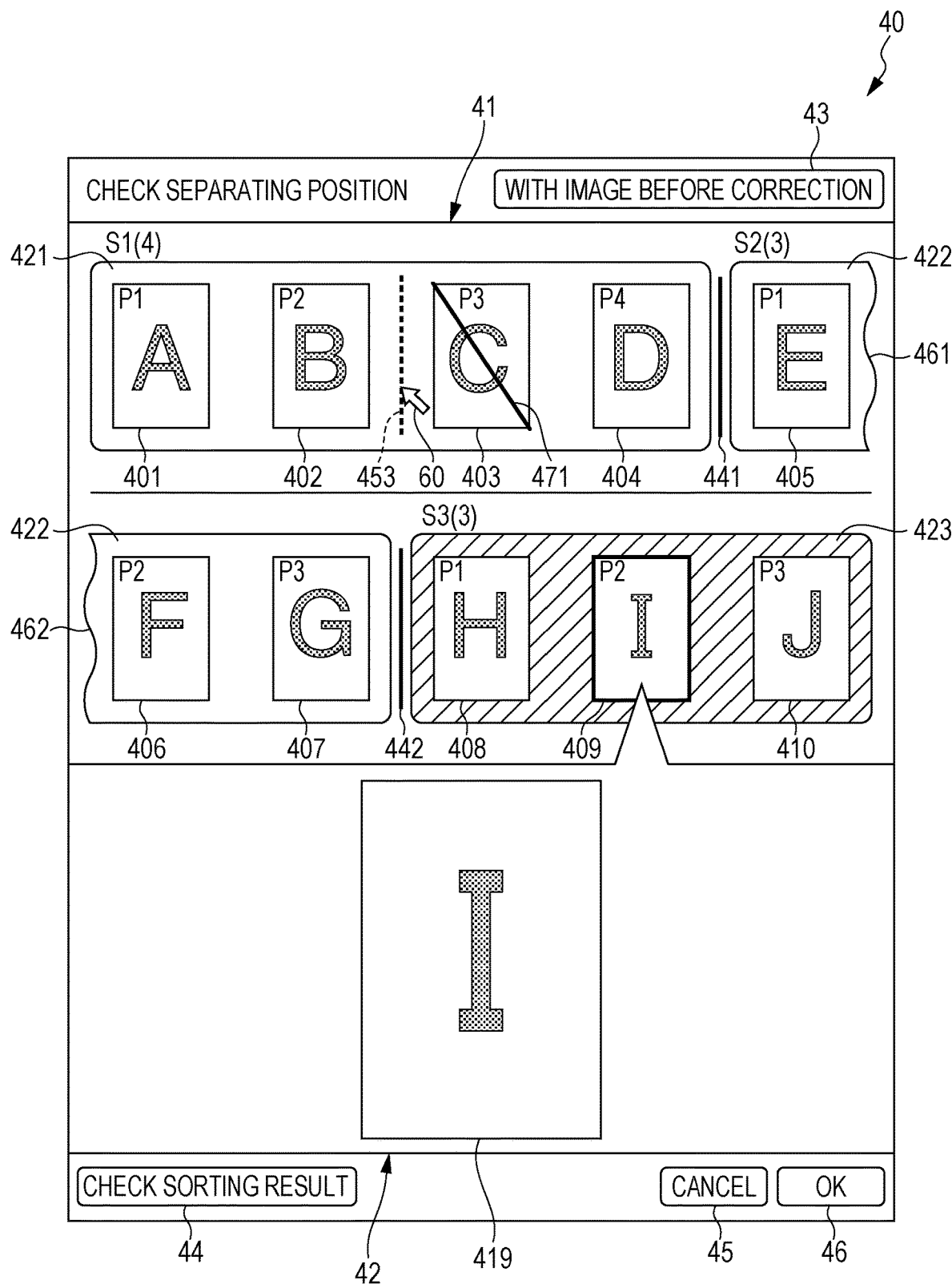
FIG. 8 is an illustration depicting an example of a screen transition of the sorting screen presented by the sorting result display unit of the document processing apparatus according to the exemplary embodiment of the present disclosure, the screen transition appearing when a sorted document is divided.
Figure 9:
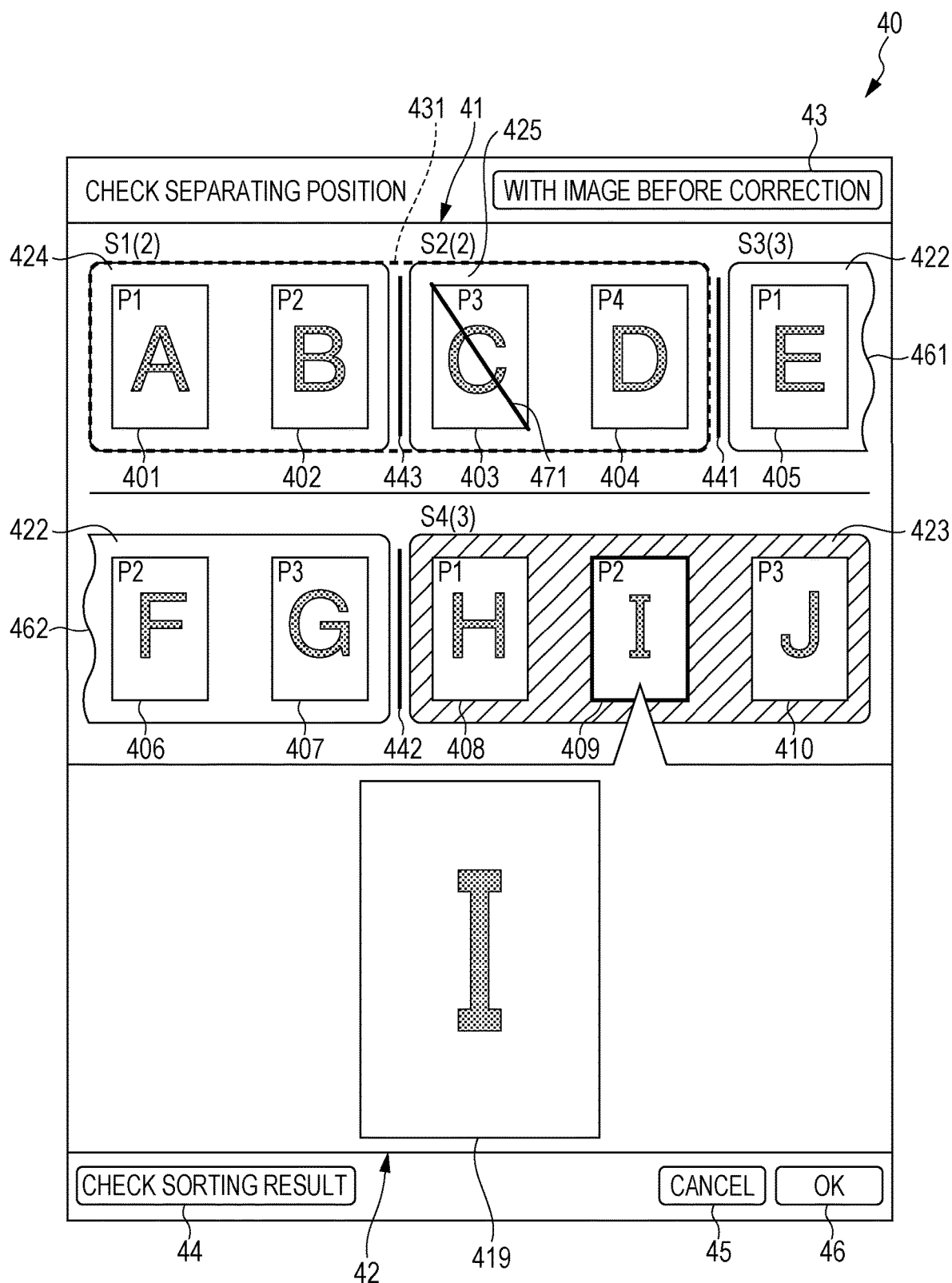
FIG. 9 is an illustration depicting an example of the screen transition of the sorting screen presented by the sorting result display unit of the document processing apparatus according to the exemplary embodiment of the present disclosure, the screen transition appearing when the sorted document is divided.

FIGS. 8 and 9 are each an illustration depicting an example of a screen transition of the sorting screen 40 presented by the sorting result display unit 23 depicted in FIG. 2, the screen transition appearing when a sorted document is divided.

In FIG. 8, a cursor 60 is moved to a position between page P2 and page P3 of the sorted document S1, and a dashed separating line 453 is presented at the position between page P2 and page P3 of the sorted document S1. A click on the dashed separating line 453 in this condition divides the sorted document S1 at the position between page P2 and page P3.

In FIG. 9, the dashed separating line 453 is changed into a solid separating line 443. The sorted document S1 is divided into a new sorted document S1 and a new sorted document S2. The new sorted document S1 contains pages P1 and P2 of the sorted document S1 before the correction, and the new sorted document S2 contains pages P3 and P4 of the sorted document S1 before the correction. To indicate the new arrangement, in the thumbnail image area 41, a region 424 indicating the range of the new sorted document S1 and a region 425 indicating the range of the new sorted document S2 are disposed instead of the region 421 indicating the range of the sorted document S1 before the correction.

In FIG. 9, since the display switch button 43 is switched to presenting the state of the sorting result before the correction, a dashed frame 431 indicating the range of the sorted document S1 before the correction is also disposed in the thumbnail image area 41.

In FIG. 9, since the sorted document S1 before the correction is divided into the new sorted documents S1 and S2, the document title S2 of the sorted document before the correction is changed to the document title S3 of the new sorted document, and the document title S3 of the sorted document before the correction is changed to the document title S4 of the new sorted document.

Figure 10:
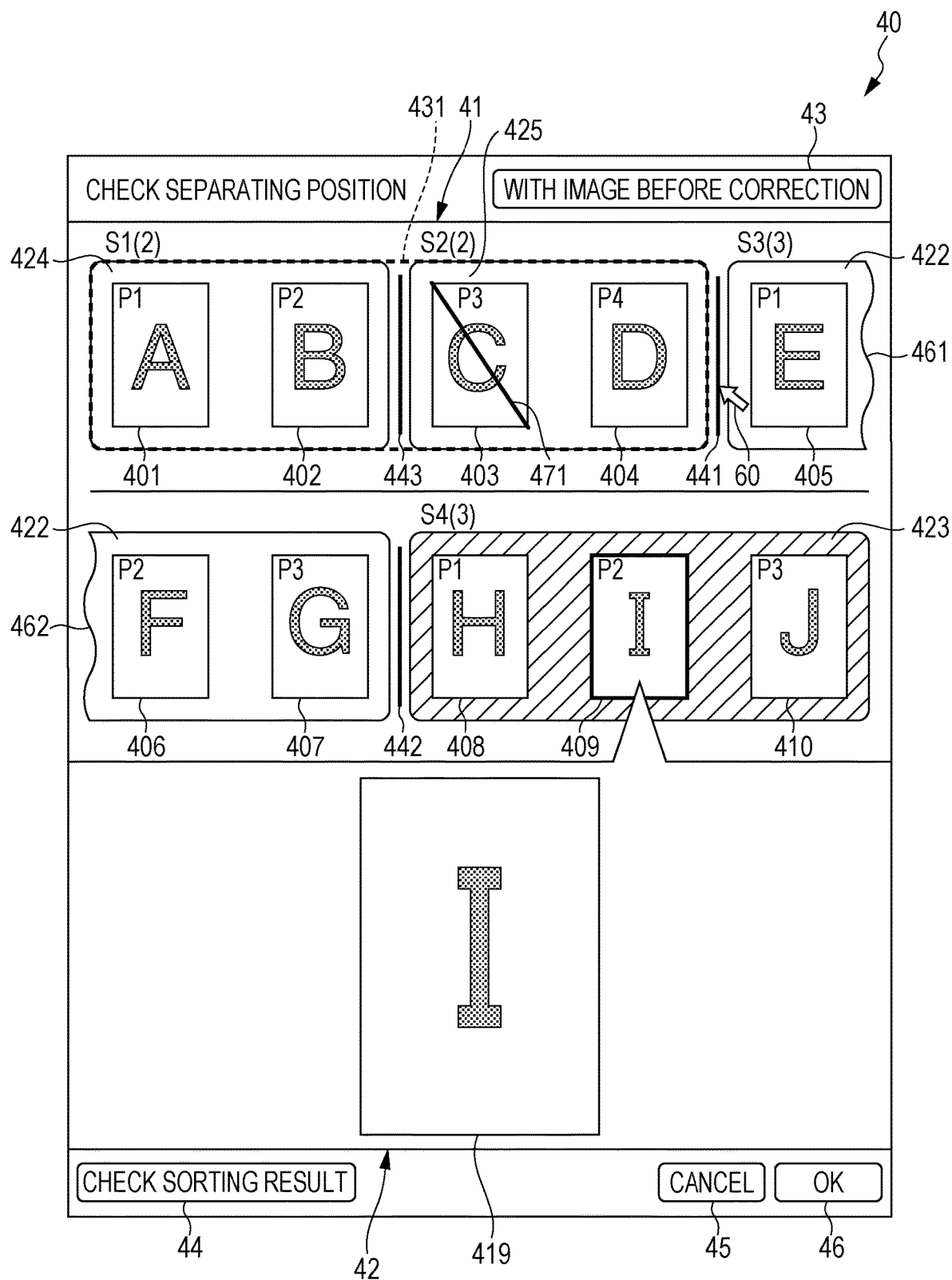
FIG. 10 is an illustration depicting an example of a screen transition of the sorting screen presented by the sorting result display unit of the document processing apparatus according to the exemplary embodiment of the present disclosure, the screen transition appearing when sorted documents are combined.
Figure 11:
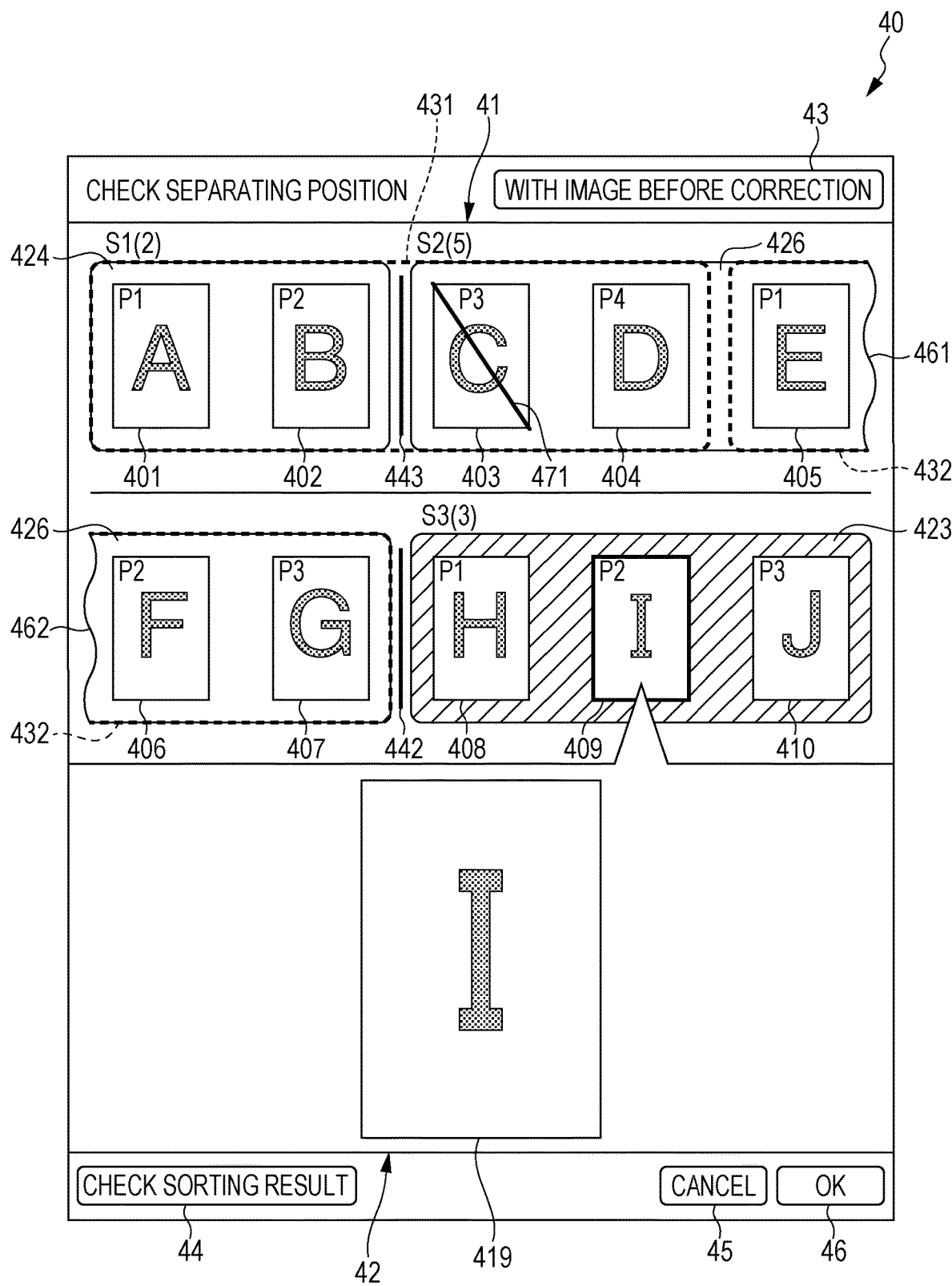
FIG. 11 is an illustration depicting an example of the screen transition of the sorting screen presented by the sorting result display unit of the document processing apparatus according to the exemplary embodiment of the present disclosure, the screen transition appearing when the sorted documents are combined.

FIGS. 10 and 11 are each an illustration depicting an example of a screen transition of the sorting screen 40 presented by the sorting result display unit 23 depicted in FIG. 2, the screen transition appearing when sorted documents are combined.

In FIG. 10, the cursor 60 is moved to the position of the separating line 441, which is located between the sorted document S2 and the sorted document S3. A click on the separating line 441 in this condition combines the sorted document S2 and the sorted document S3.

In FIG. 11, the separating line 441 has disappeared. The sorted document S2 before the correction and the sorted document S3 before the correction are combined into a new sorted document S2. To indicate the new arrangement, in the thumbnail image area 41, a region 426 indicating the range of the new sorted document S2 is disposed instead of the region 425 indicating the range of the sorted document S2 before the correction and the region 422 indicating the range of the sorted document S3 before the correction.

In FIG. 11, since the display switch button 43 is switched to presenting the state of the sorting result before the correction, a dashed frame 432 indicating the range of the sorted document S2 before the correction is also disposed in the thumbnail image area 41.

In FIG. 11, since the sorted documents S2 and S3 before the correction are combined into the new sorted documents S2, the document title S4 of the sorted document before the correction is changed to the document title S3 of the new sorted document.

Figure 12:
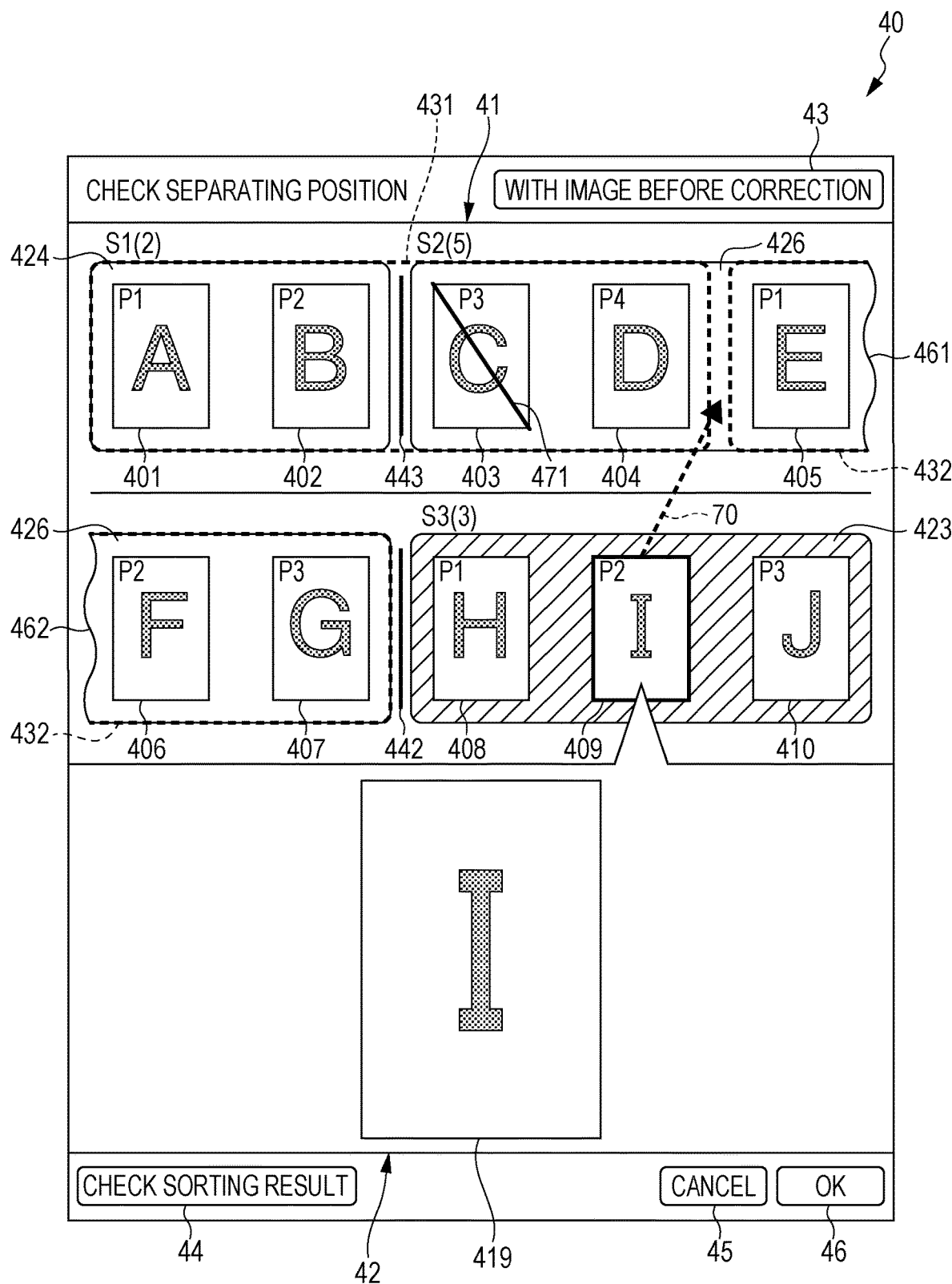
FIG. 12 is an illustration depicting an example of a screen transition of the sorting screen presented by the sorting result display unit of the document processing apparatus according to the exemplary embodiment of the present disclosure, the screen transition appearing when a page of a sorted document is moved to another sorted document.
Figure 13:
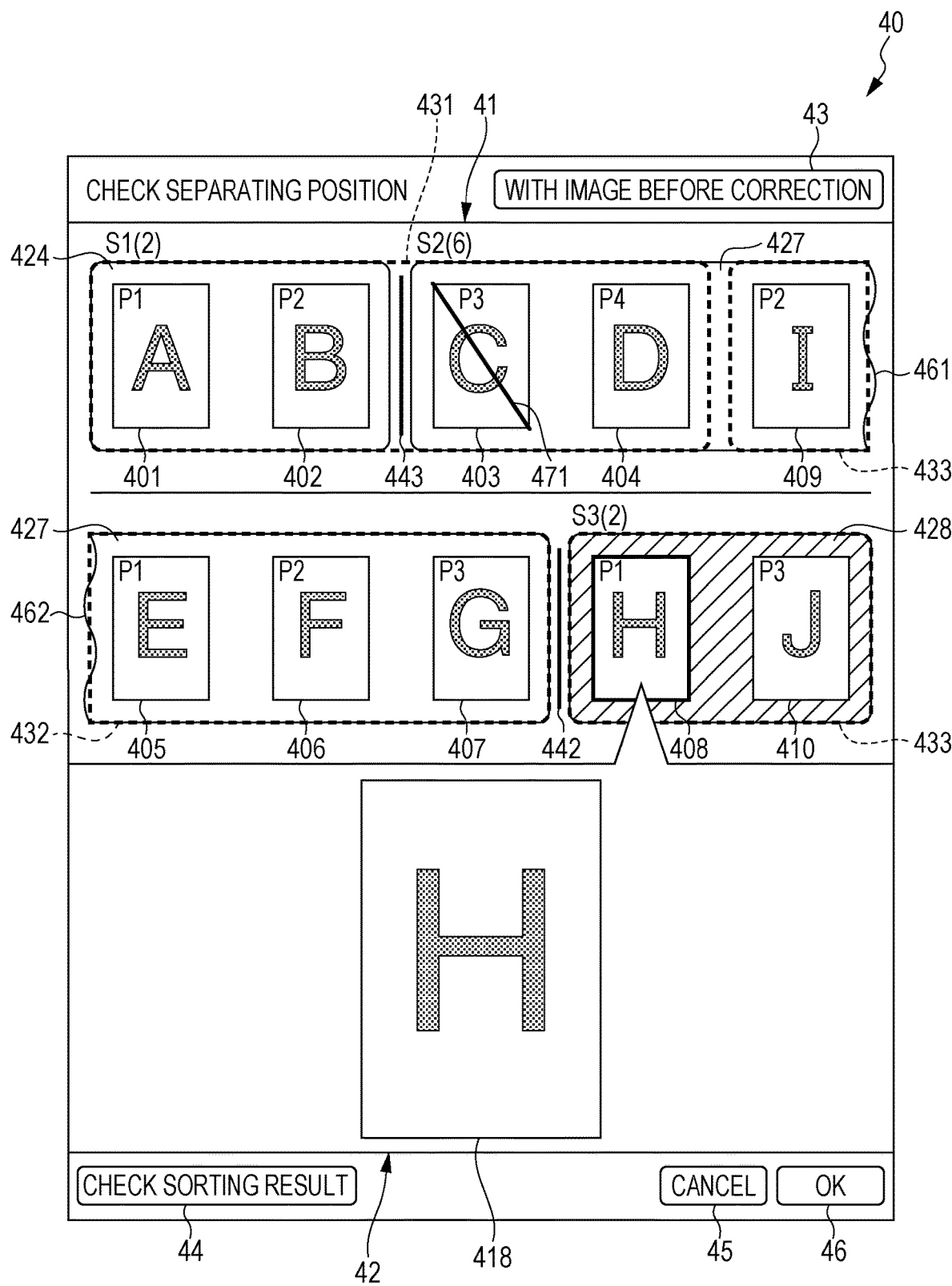
FIG. 13 is an illustration depicting an example of the screen transition of the sorting screen presented by the sorting result display unit of the document processing apparatus according to the exemplary embodiment of the present disclosure, the screen transition appearing when the page of the sorted document is moved to another sorted document.

FIGS. 12 and 13 are each an illustration depicting an example of a screen transition of the sorting screen 40 presented by the sorting result display unit 23 depicted in FIG. 2, the screen transition appearing when a page of a sorted document is moved to another sorted document.

In FIG. 12, page P2 of the sorted document S3 is selected and moved to the sorted document S2 by a drag-and-drop operation as indicated by an arrow 70. This operation moves page P2 of the sorted document S3 to the sorted document S2.

In FIG. 13, a thumbnail image 409 disposed in the region 423 is moved into the region 426. The region 423 is changed to a region 428, and the region 426 is changed to a region 427.

In FIG. 13, since the display switch button 43 is switched to presenting the state of the sorting result before the correction, a dashed frame 433 indicating the range of the sorted document S3 before the correction is also disposed in the thumbnail image area 41. In this case, since the range of the sorted document S3 before the correction is divided into the first and second rows, the dashed frame 433 is desirably designed to be recognized to indicate that a portion in the first row and a portion in the second row belong to the same sorted document. The dashed frames may desirably be colored differently. For example, the dashed frame 431 indicating the range of the sorted document S1 before the correction may be colored red, the dashed frame 432 indicating the range of the sorted document S2 before the correction may be colored green, and the dashed frame 433 indicating the range of the sorted document S3 before the correction may be colored yellow both in the first row and in the second row.

Figure 14:
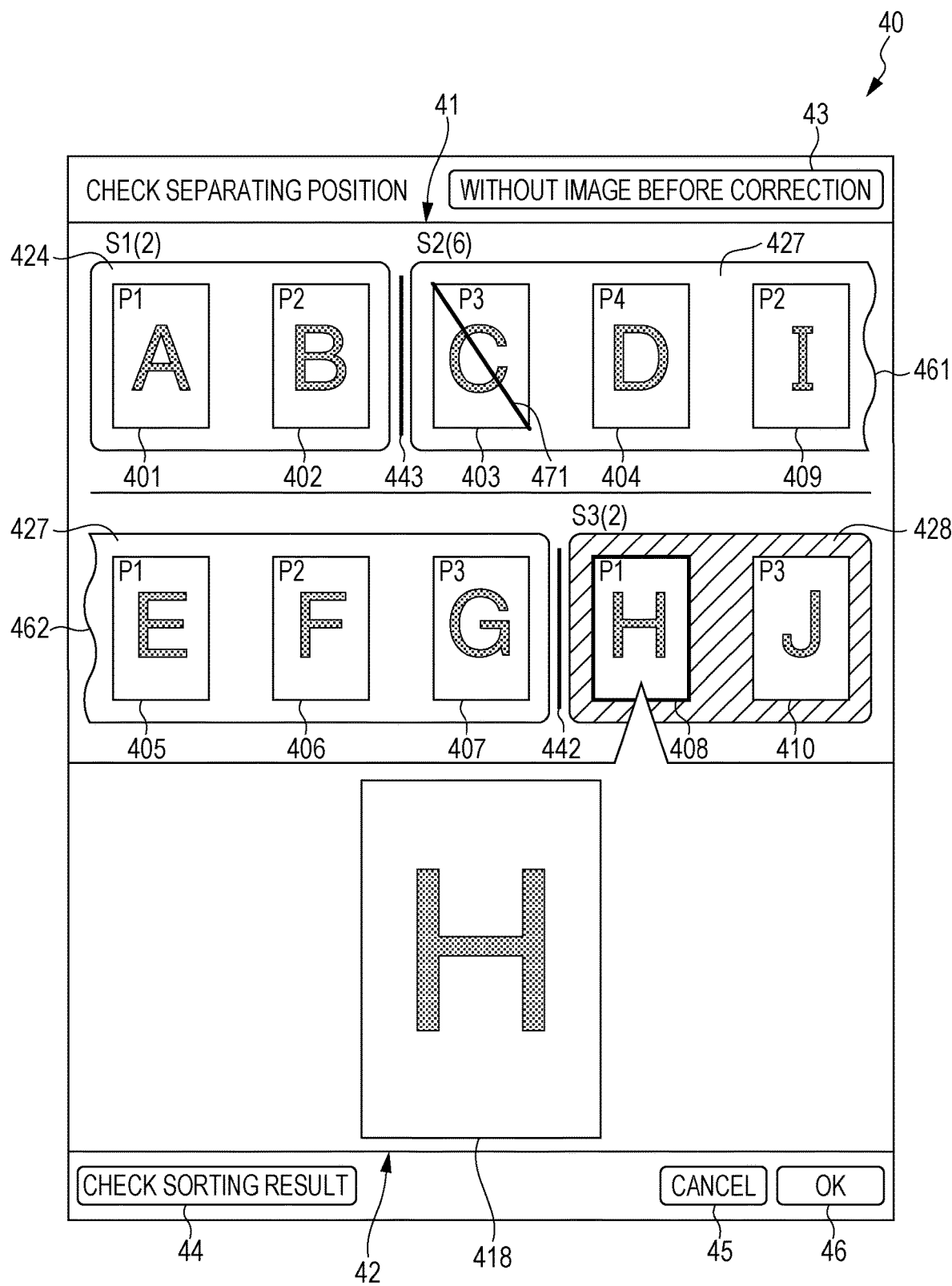
FIG. 14 is an illustration depicting an example of the sorting screen presented by the sorting result display unit of the document processing apparatus according to the exemplary embodiment of the present disclosure, the sorting screen appearing when a display switch button is switched to hiding a state of a sorting result before a correction.

FIG. 14 is an illustration depicting an example of the sorting screen 40 presented by the sorting result display unit 23 depicted in FIG. 2, the sorting screen 40 appearing when the display switch button 43 is switched to hiding the state of the sorting result before the correction. The message "without image before correction" on the display switch button 43 indicates that hiding the state of the sorting result before the correction is selected.

In FIG. 14, since the display switch button 43 is switched to hiding the state of the sorting result before the correction, the dashed frames 431 to 433 are not disposed in the thumbnail image area 41.

Figure 15:
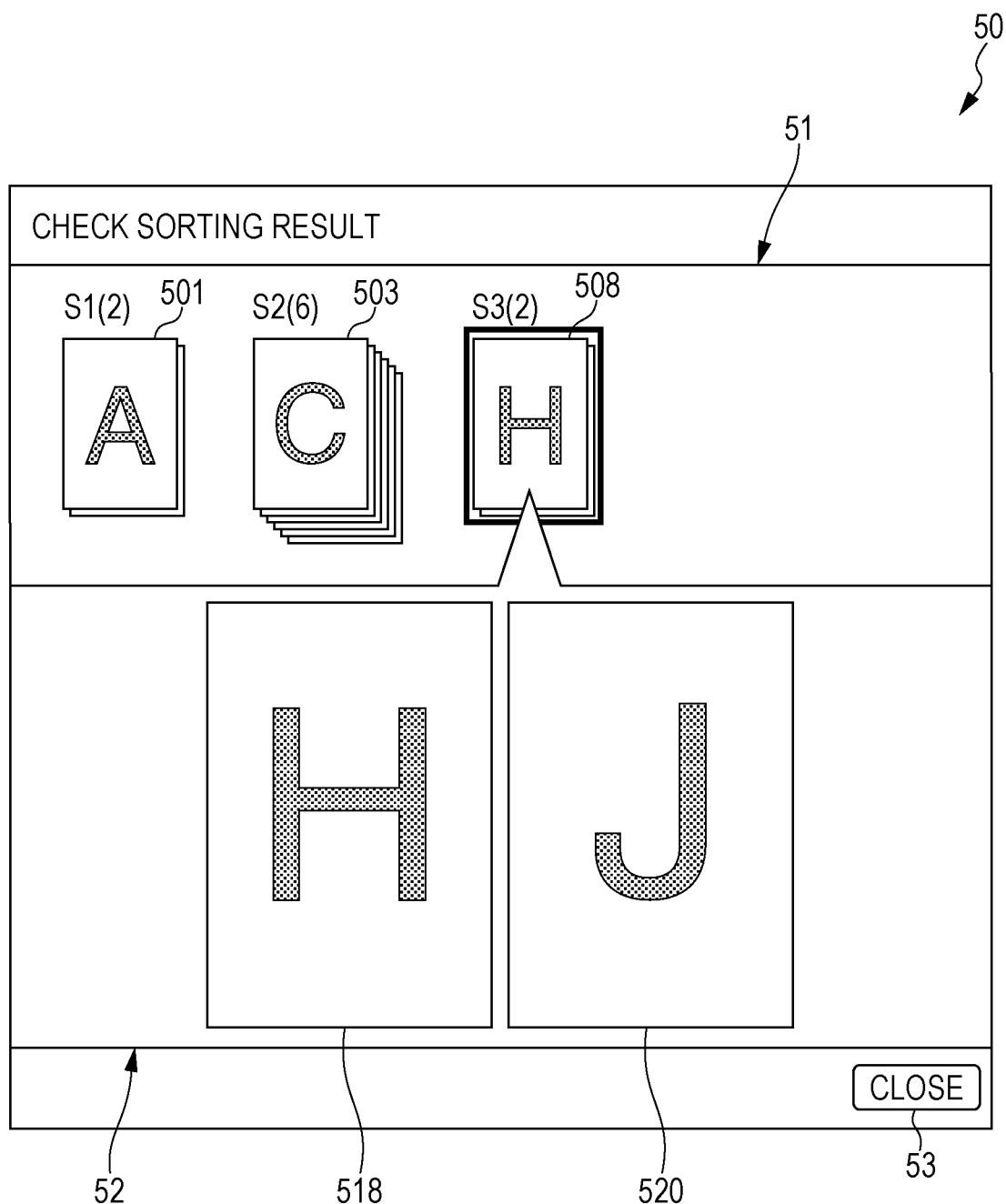
FIG. 15 is an illustration depicting an example of a sorting result check screen presented by the sorting result display unit of the document processing apparatus according to the exemplary embodiment of the present disclosure.

FIG. 15 is an illustration depicting an example of a sorting result check screen 50 presented by the sorting result display unit 23 depicted in FIG. 2. The sorting result check screen 50 is used to check a sorting result and displayed by pushing the sorting result check button 44 in any of the conditions depicted in FIGS. 7 to 14. FIG. 15 depicts an example screen appearing when the sorting result check button 44 is pushed in the condition depicted in FIG. 14.

As depicted in FIG. 15, the sorting result check screen 50 includes a thumbnail image area 51, a document image area 52, and a close button 53.

The thumbnail image area 51 is an area where thumbnail images of sorted documents are arranged. In FIG. 15, a thumbnail image 501 of the sorted document S1, a thumbnail image 503 of the sorted document S2, and a thumbnail image 508 of the sorted document S3 are arranged in the thumbnail image area 51. In contrast to the sorting screen 40, since the sorting result check screen 50 is used to check the final state of the sorted documents, the thumbnail images 501, 503, and 508 are each an image, for example, imitating a document having bound sheets of paper.

The document image area 52 is an area where document images of the pages of a selected sorted document are disposed. In FIG. 15, as depicted by using a thick enclosing rectangle, the sorted document S3 is selected, and thus document images 518 and 520 of the pages of the sorted document S3 are arranged.

The close button 53 is used to close the sorting result check screen 50, and if pushed, the screen returns to the sorting screen 40.

Processor

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Non-Transitory Computer Readable Medium

Processing performed by the document processing apparatus 10 according to the present exemplary embodiment is, for example, provided as a non-transitory computer readable medium storing a program such as application software.

A non-transitory computer readable medium realizing the present exemplary embodiment stores a program causing a computer to execute a process for information processing, and the process includes accepting designation of a set as a first set that needs a correction to a sorting result, the set being one of sets into which a plurality of types of data are sorted by type, and causing data included in the first set and data not included in the first set to be presented in response to an acceptance of the designation, the data not included in the first set being included in the plurality of types of data including the first set.

A program realizing the present exemplary embodiment may be provided by transmission via a communication unit or in a stored form in a recording medium, such as a compact-disc ROM (CD-ROM).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
sort a plurality of types of data by type, the plurality of types of data including first data and second data,
accept designation of a first set that needs a correction to a sorting result, the first set including the first data and being one of a plurality of sets into which the plurality of types of data are sorted by type, the first set not including the second data,
cause a display to display the first data and the second data in a same screen, in response to acceptance of the designation, and
report to at least one operator who manipulates the second data that the first data is present,
wherein if the first data is unsuitable for the first set, the correction to the sorting result is to move the first data from the first set.

2. The information processing apparatus according to claim 1,
wherein the processor is configured to cause the display to display the first data and the second data in a distinguishable manner.

3. The information processing apparatus according to claim 1,
wherein the processor is configured to accept instructions to perform a re-sorting operation on the plurality of types of data.

4. The information processing apparatus according to claim 3,
wherein the processor is configured to cause the display to display a state before the re-sorting operation.

5. The information processing apparatus according to claim 4,
wherein the processor is configured to control switching between presenting the state before the re-sorting operation and hiding the state before the re-sorting operation.

6. The information processing apparatus according to claim 3,
wherein the processor is configured to cause the display to display a state after the re-sorting operation.

7. The information processing apparatus according to claim 3,
wherein the processor is configured to report to an operator who manipulates data modified by the re-sorting operation that the modified data has been modified.

8. The information processing apparatus according to claim 1,
wherein the processor is configured to remove the first data from the plurality of types of data if the first data is not to be included in the second data either.

9. A non-transitory computer readable medium storing a program causing a computer to execute a process for information processing, the process comprising:
- sorting a plurality of types of data by type, the plurality of types of data including first data and second data;
- accepting designation of a first set that needs a correction to a sorting result, the first set including the first data and being one of a plurality of sets into which the plurality of types of data are sorted by type, the first set not including the second data;
- causing a display to display the first data and the second data in a same screen, in response to acceptance of the designation; and
- report to at least one operator who manipulates the second data that the first data is present,
- wherein if the first data is unsuitable for the first set, the correction to the sorting result is to move the first data from the first set.

10. An information processing apparatus comprising:
- means for sorting a plurality of types of data by type, the plurality of types of data including first data and second data;
- means for accepting designation of a first set that needs a correction to a sorting result, the first set including the first data and being one of sets into which the plurality of types of data are sorted by type, the first set not including the second data;
- means for causing a display to display the first data and the second data in a same screen, in response to acceptance of the designation; and
- means for reporting to at least one operator who manipulates the second data that the first data is present,
- wherein, if the first data is unsuitable for the first set, the correction to the sorting result is to move the first data from the first set.

* * * * *